United States Patent [19]

Haske

[11] Patent Number: 5,033,005
[45] Date of Patent: Jul. 16, 1991

[54] ANALYTICAL COMPUTER-AIDED MACHINING SYSTEM AND METHOD

[75] Inventor: Carl Haske, Ann Arbor, Mich.

[73] Assignee: Schlumberger Technologies, Inc., San Jose, Calif.

[21] Appl. No.: 467,336

[22] Filed: Jan. 19, 1990

Related U.S. Application Data

[63] Continuation of Ser. No. 240,977, Sep. 6, 1988, abandoned.

[51] Int. Cl.$^5$ ............................................. G06F 15/46
[52] U.S. Cl. ........................... 364/474.29; 364/474.18
[58] Field of Search ....................... 364/474.18, 474.28, 364/474.29, 474.31, 474.34, 474.35, 474.37, 551.02, 191, 167.01; 318/570, 572

[56] References Cited

U.S. PATENT DOCUMENTS

| | | | |
|---|---|---|---|
| 4,042,866 | 8/1977 | Morita et al. | 318/568 |
| 4,618,924 | 10/1986 | Hinds | 364/191 |
| 4,789,931 | 12/1988 | Kuragano et al. | 364/474.18 |
| 4,791,579 | 12/1988 | Kranitzky | 364/518 |
| 4,792,889 | 12/1988 | Krägelin et al. | 364/191 |
| 4,868,761 | 9/1989 | Hayashi | 364/474.24 |
| 4,886,631 | 9/1989 | Kuragano et al. | 364/474.29 |

OTHER PUBLICATIONS

Foley, James D., et al., *Fundamentals of Interactive Computer Graphics*, Addison-Wesley Publishing Co., Reading, Mass., Chap. 13, "Representation of 3D Shapes," pp. 505-537.

Childs, James J., *Numerical Control Part Programming*, 3d Printing, Industrial Press Inc., New York, Chaps. 8 & 9, "Computer-Assisted Part Programming, the APT System" and "Geometry, Auxiliary, and Post Process Statements as Used in APT," pp. 188-244.

*Primary Examiner*—Jerry Smith
*Assistant Examiner*—Paul Gordon
*Attorney, Agent, or Firm*—Townsend and Townsend

[57] ABSTRACT

A computer-aided machining system is described which implements a method of geometrically-intersecting offset surfaces and drive surface to automatically generate tool control paths. Preferably, the machine tool is controlled by characterizing the shape of the part to be milled using the mathematical representation, and from that mathematical representation calculating an approximate offset surface for the surface to be milled. The approximate offset surface is compared with the drive surface for the machine tool to define an approximate tool control point curve. The actual tool control point curve is then calculated by comparing the approximate tool control point curve with the mathematical representation of the surface of the part. The actual tool control point curve can then be supplied to a machine tool to enable it to mill the part surface.

16 Claims, 10 Drawing Sheets

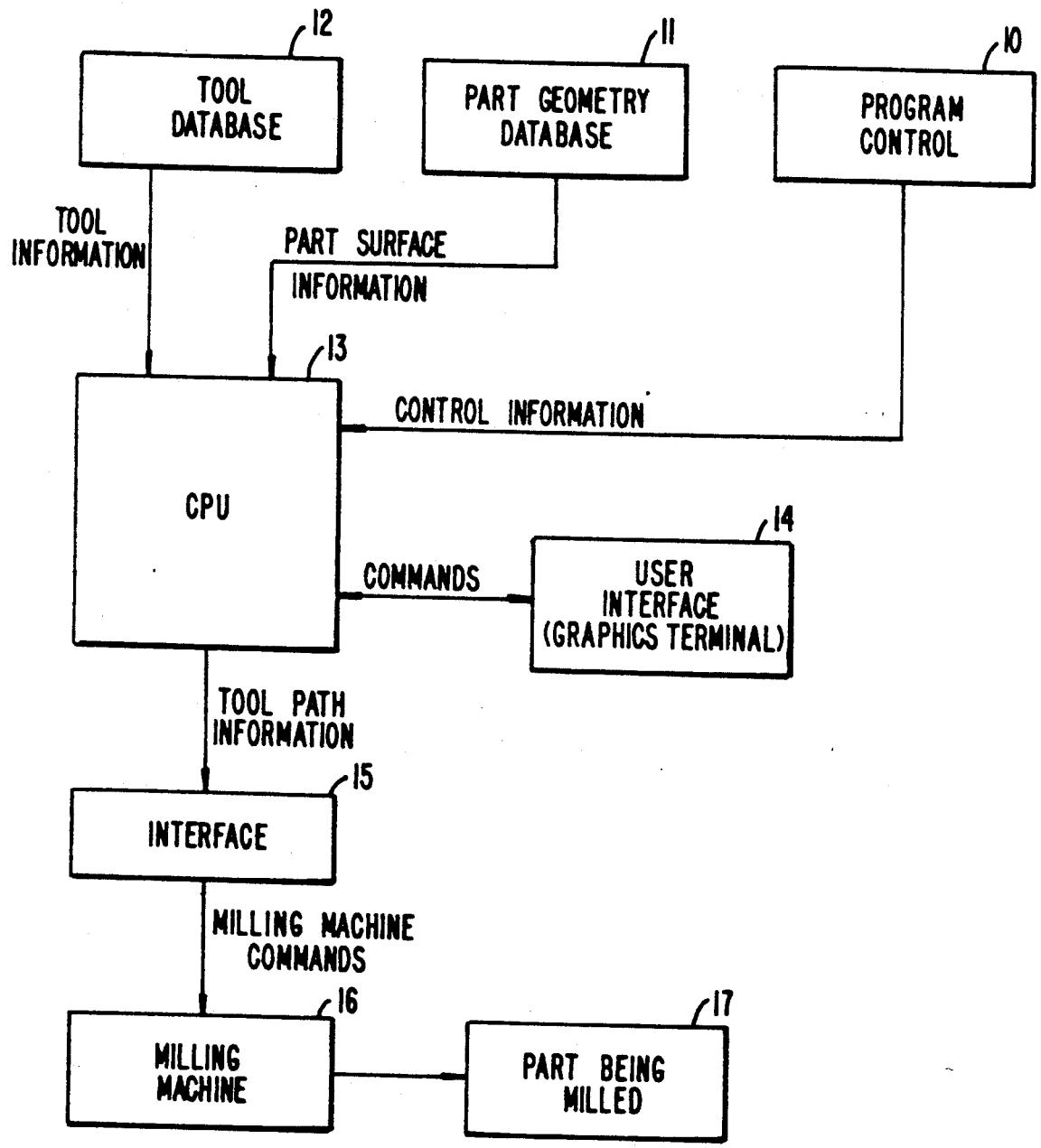
FIG._1.

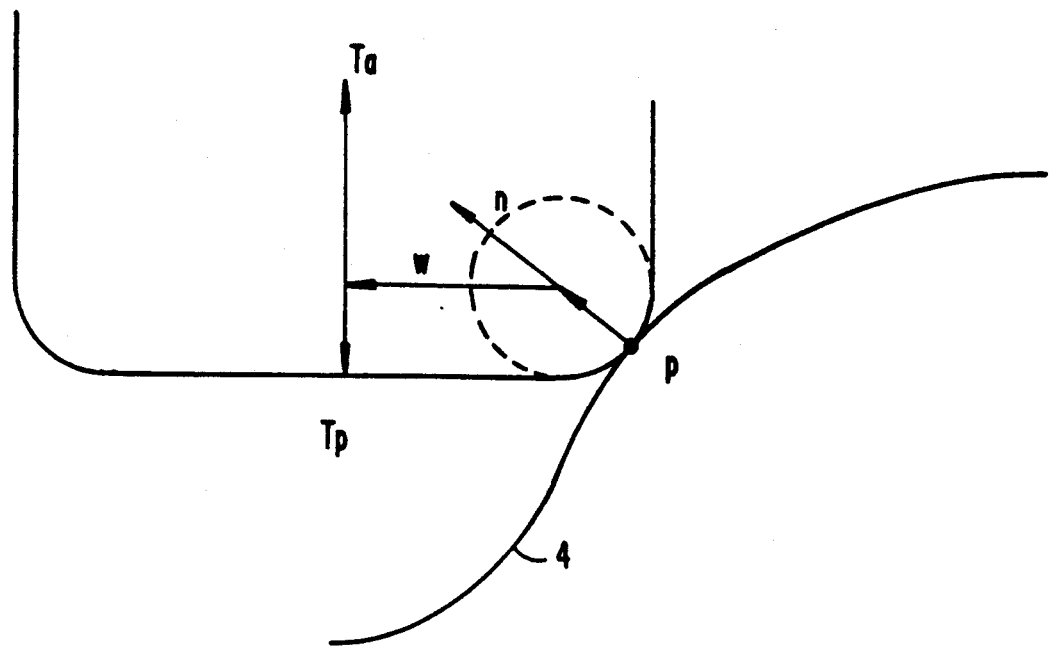
FIG._2.
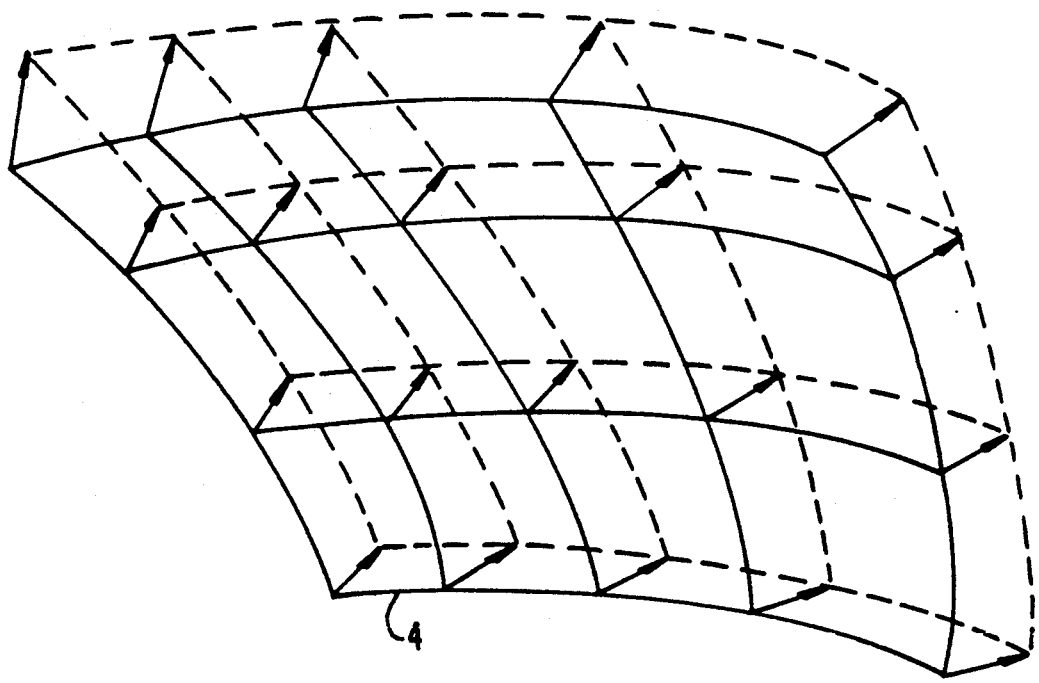
FIG._3.

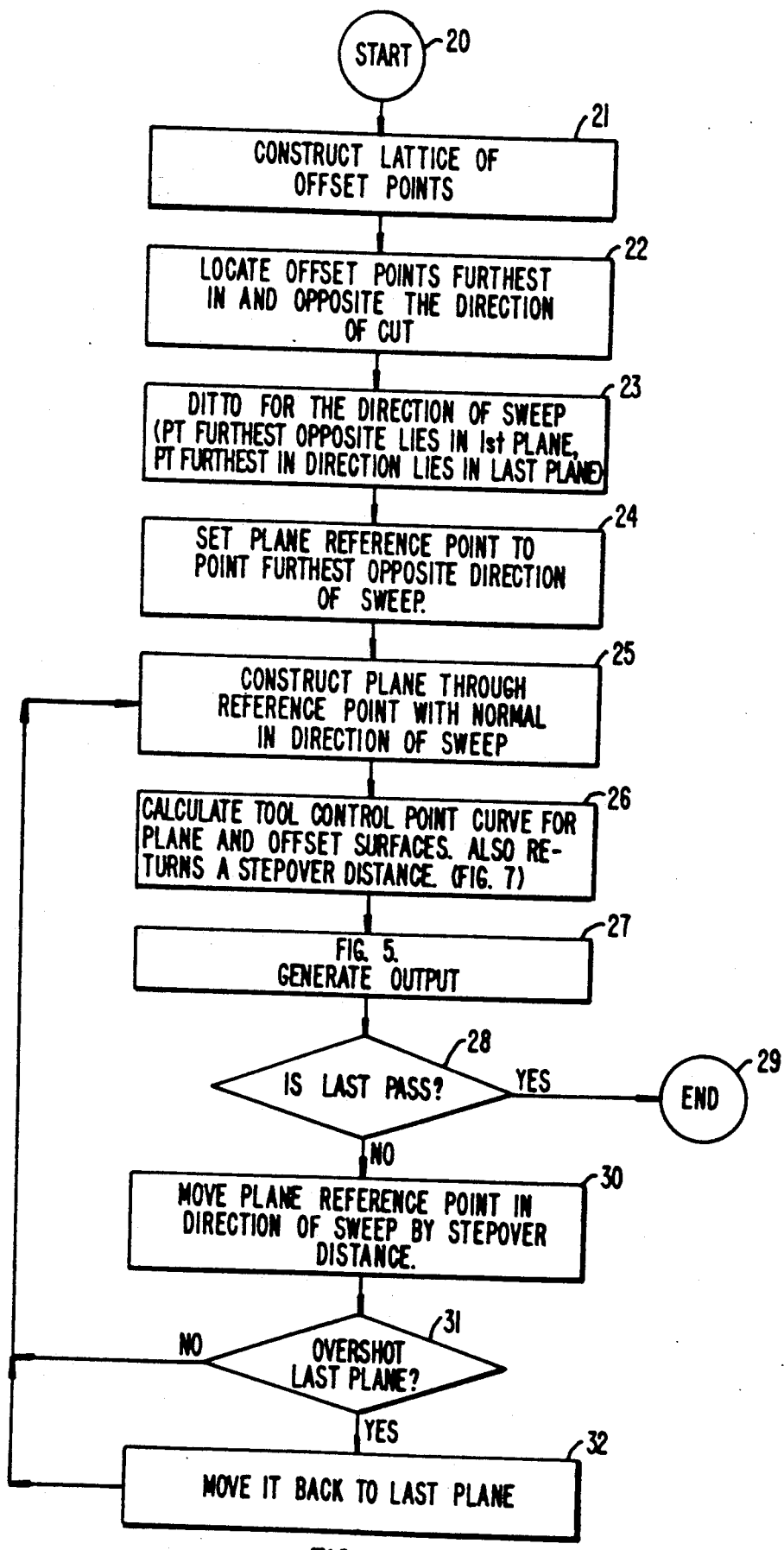
FIG._4.

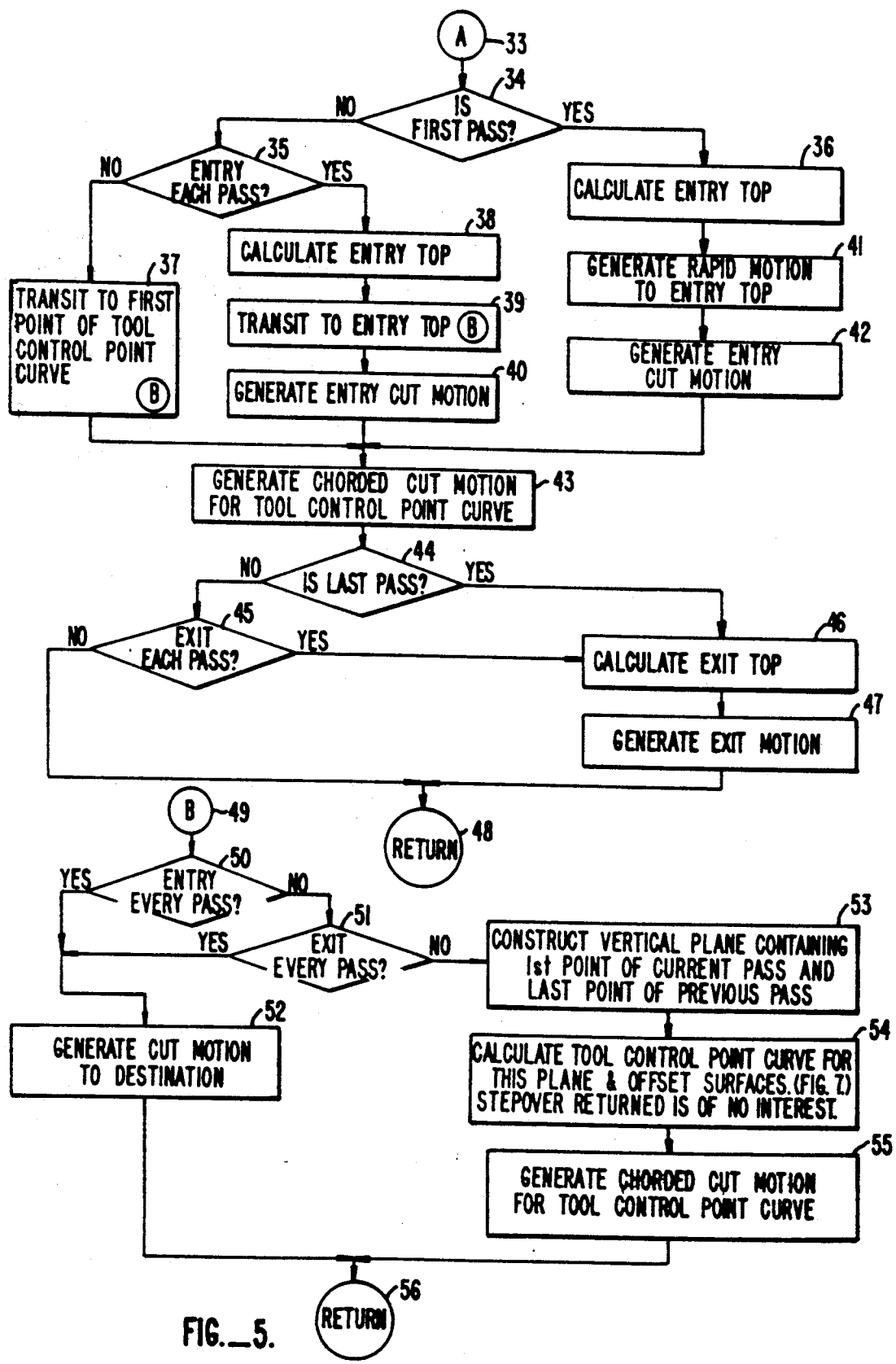
FIG._5.

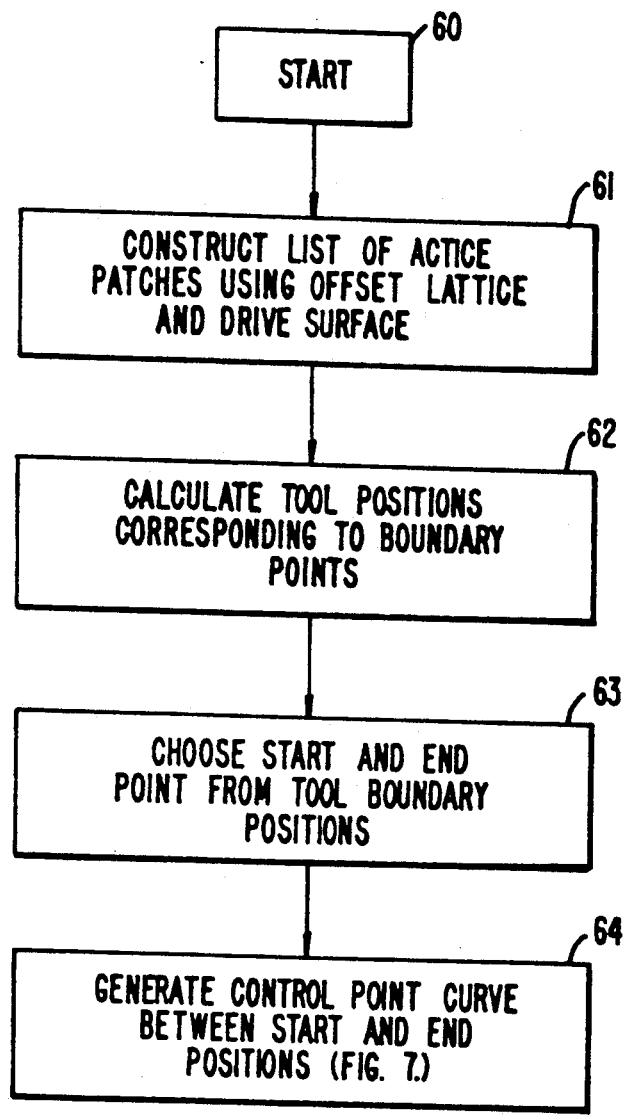
FIG._6.

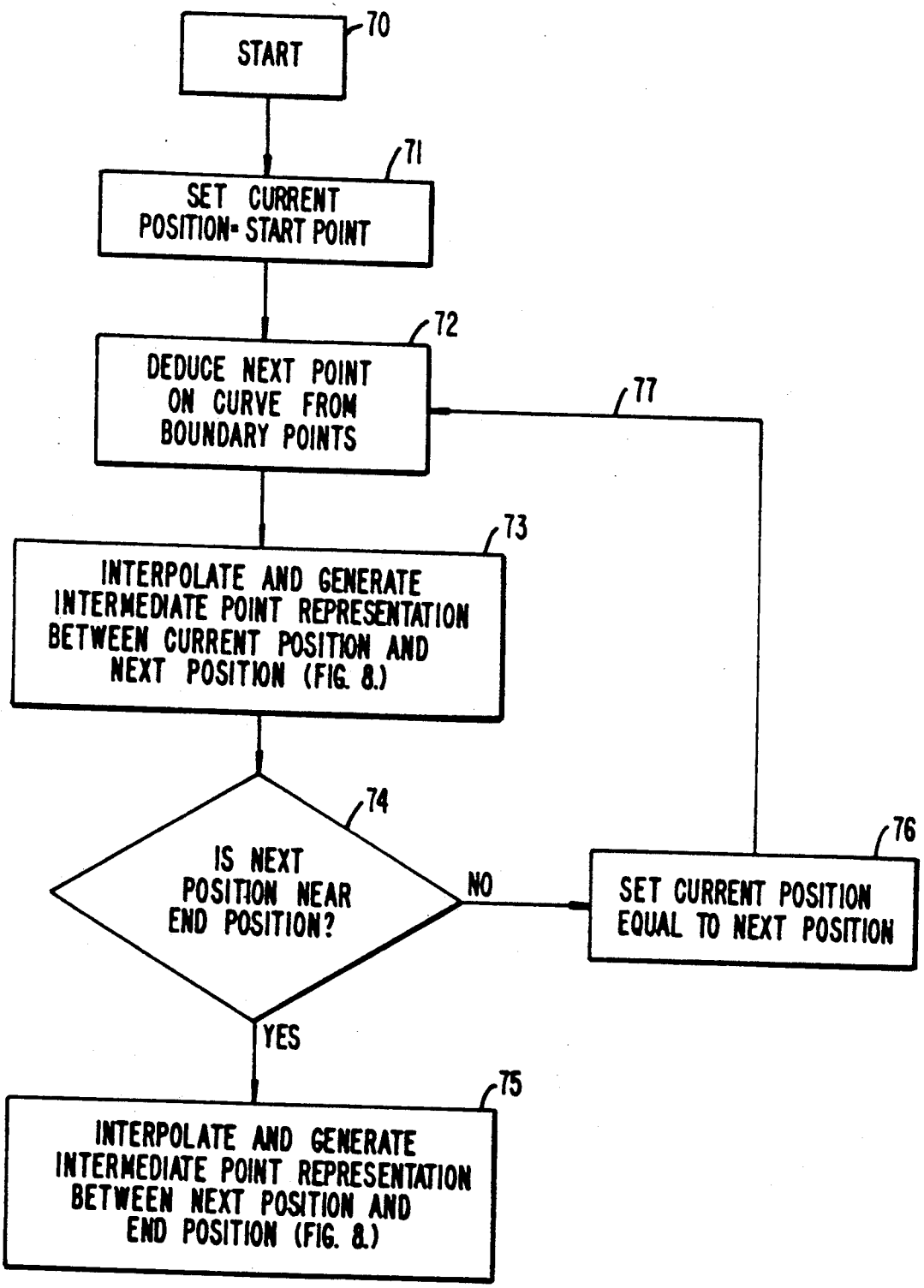
FIG._7.

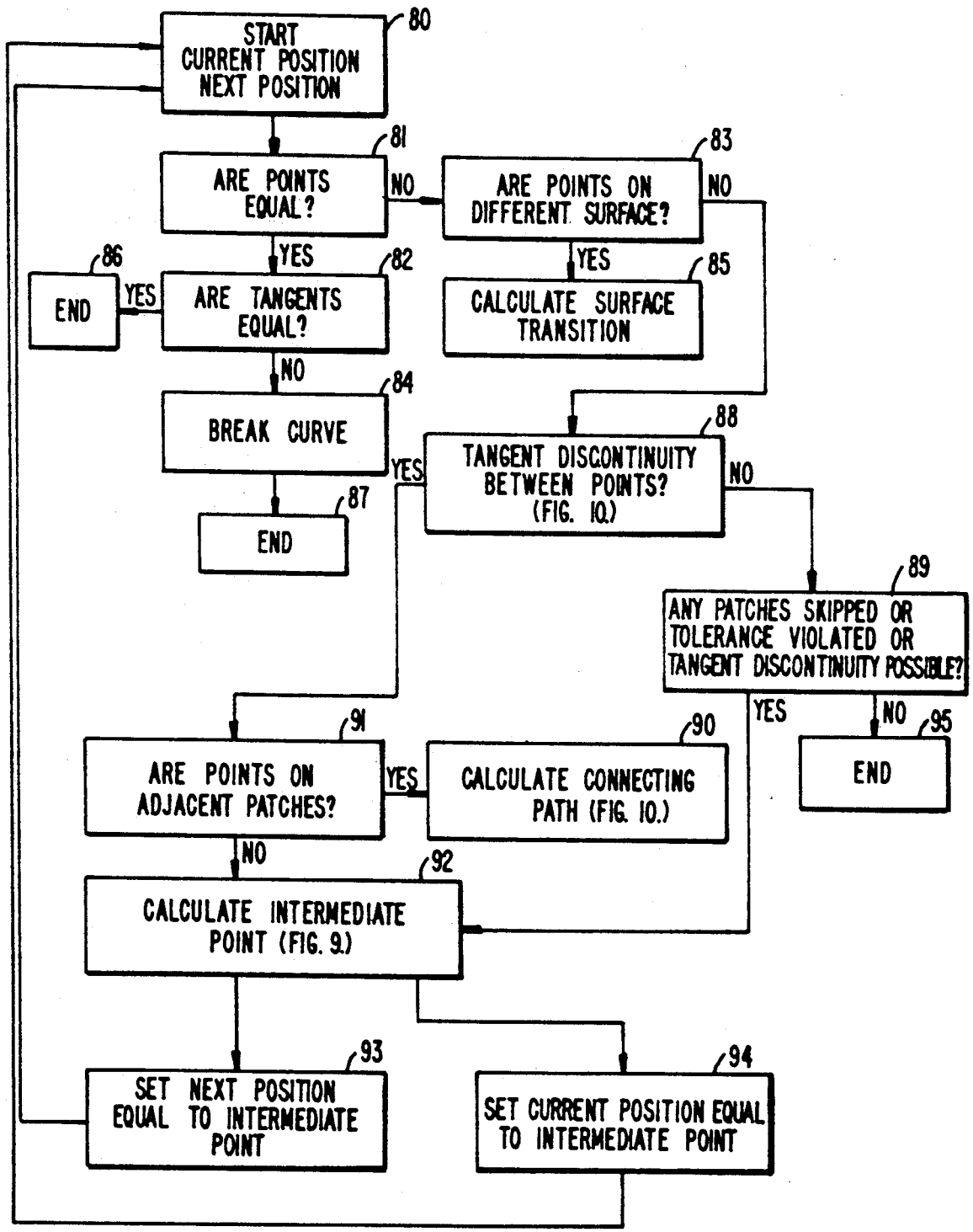
FIG._8.

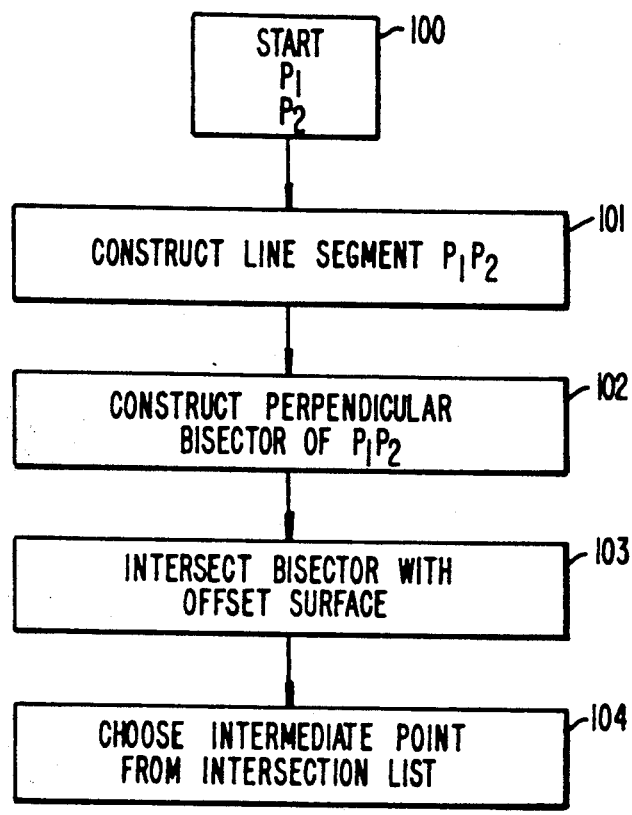
FIG._9.
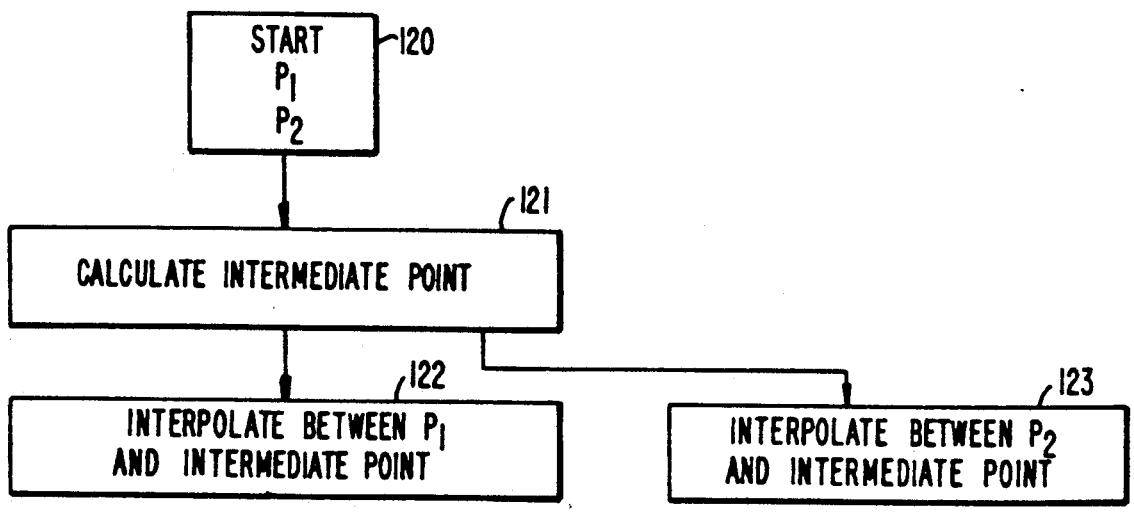
FIG._11.

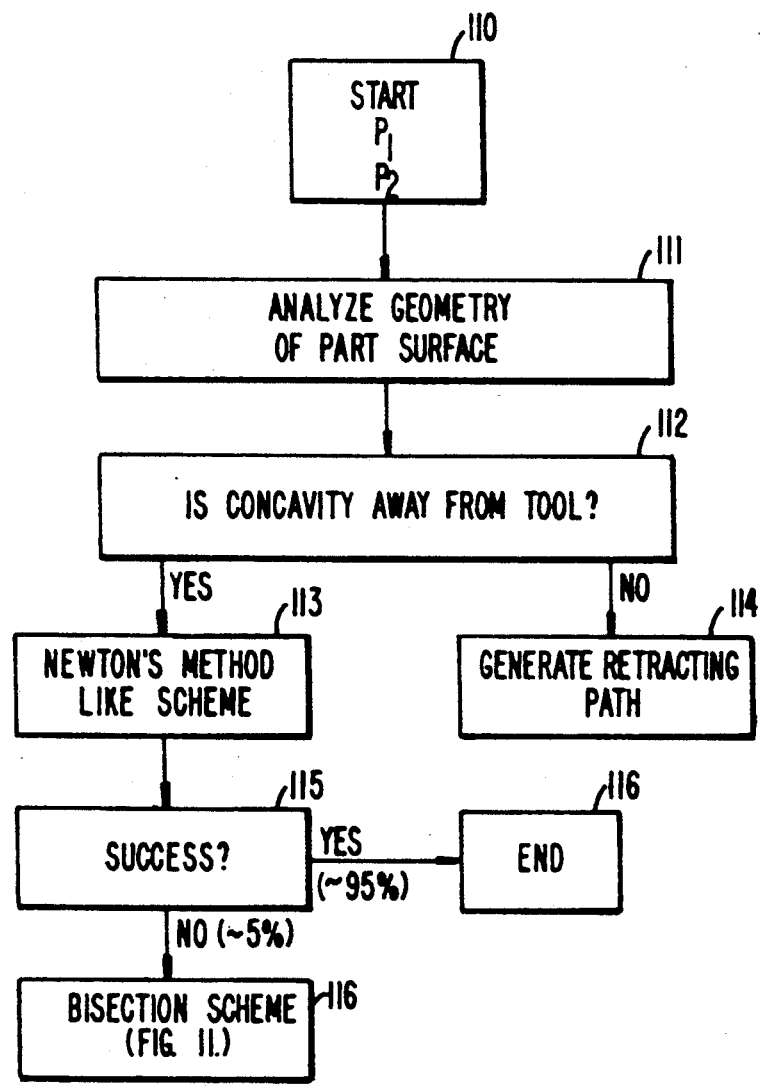
FIG._10.

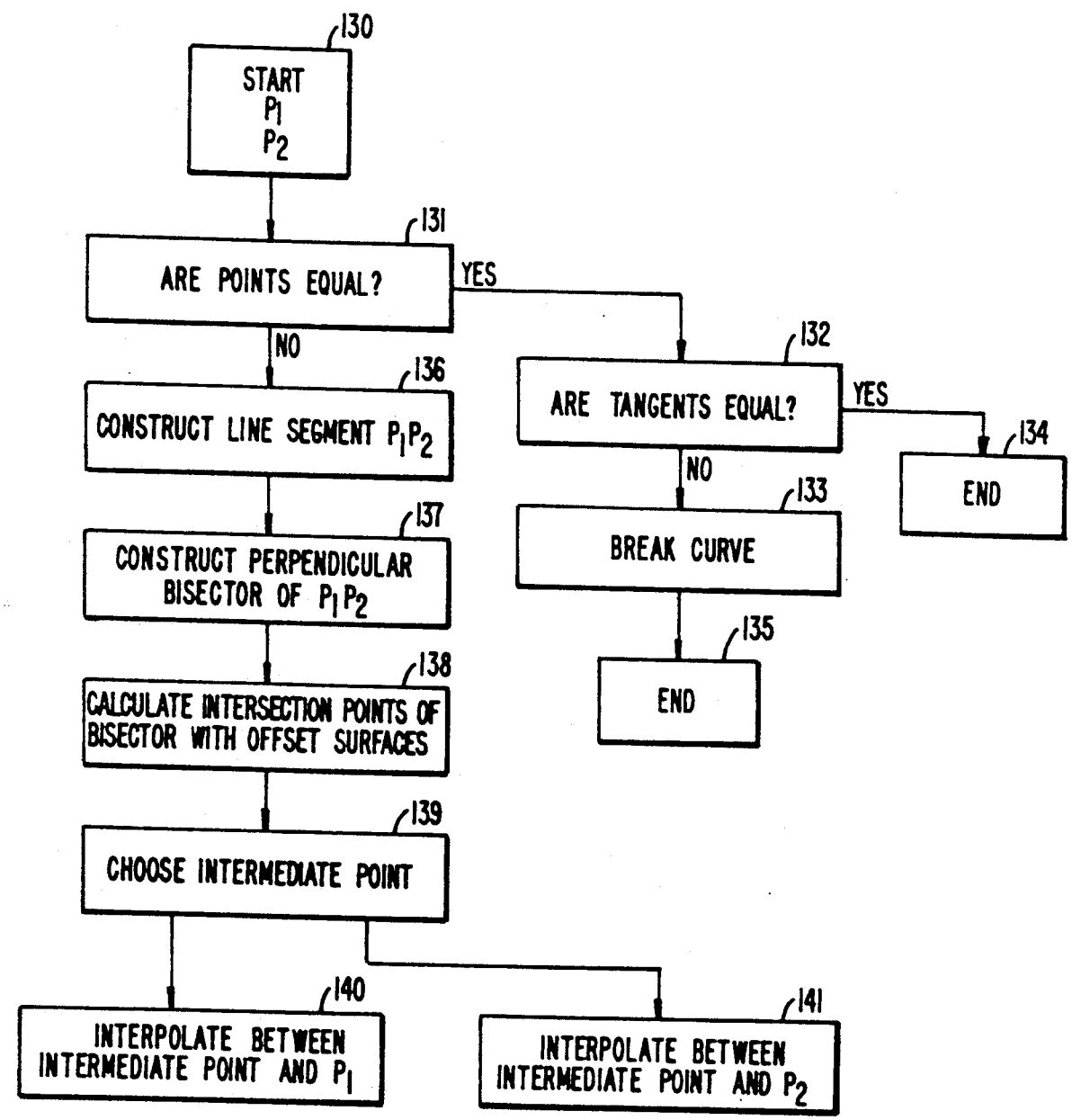
FIG._12.

ANALYTICAL COMPUTER-AIDED MACHINING SYSTEM AND METHOD

This is a continuation of application Ser. No. 07/240,977, filed Sept. 6, 1988, now abandoned.

BACKGROUND OF THE INVENTION

1. Field of the Invention

This invention relates to computer-aided machining systems. In particular, this invention relates to a computer-aided machining system and method for implementing the geometric intersection of offset surfaces and drive surfaces to automatically generate tool paths.

2. Description of the Prior Art

The use of computers in machining or manufacturing of three-dimensional components is well known. In such systems, it is necessary to calculate a cutting path for a machine tool based upon the geometry of both the cutting tool and the component to be manufactured. At present the leading system frequently employed in such operations is the automatically programmed tool system (or "APT"). This system enjoys widespread use and has a broad range of capabilities. The APT system derives a control point curve for the tool from the tool to machine the component using a recursive procedure. Recursion is stopped when the tool is within a tolerance band. As a result the APT system is not an exact one, but relies upon the tool moving within a desired tolerance to control the machining operation. Because the APT system requires the computation of tool passes one at a time with the user overseeing the tool passes, it is undesirably slow.

In operation, the APT system attempts to convert all surfaces of the component into a single surface, and is therefore limited to a fixed number of surfaces for simultaneous cutting. For example, if an automobile part such as a door frame with 200 separate surfaces is being machined, the APT system requires the door to be broken into different portions with each portion machined separately from the other portions. As a result, writing the program to control the appropriate machine tools for the machining of the door is extremely complex.

An additional disadvantage of the APT system is its inability to handle tangent discontinuities, that is, regions on a surface such as sharp corners where a tangent to the surface changes noncontinuously. The APT system requires a smooth control point curve for its tools. Because of the recursive procedures employed in the APT system, exact solutions are not provided, and the user is required to program each pass with an understanding of the prior passes. This requires extensive operator intervention during the time the program is being created to control the machining.

SUMMARY OF THE INVENTION

The system of our invention employs the geometry of the surface of the ultimately-machined part to build up the control point curve for particular tools to manufacture that part. The three-dimensional part data is used to get the tool point. The system relies upon computation of the intersection of surfaces, even though those intersections may not be well behaved. In addition, the system computes an exact tool position, not a tolerance band. The system has enough intelligence to sort out unusual cases and take appropriate action.

BRIEF DESCRIPTION OF THE DRAWINGS

FIG. 1 is a block diagram of an overall analytical computer-aided machining system.

FIG. 2 is a diagram illustrating the interaction of a tool with a part surface.

FIG. 3 is a diagram illustrating the relationship of an offset lattice to the part surface.

FIG. 4 is a flowchart illustrating the main loop in the computer system program stored in unit 10 of FIG. 1.

FIG. 5 is a flowchart illustrating the step of generating output signals shown in block 27 in FIG. 4.

FIG. 6 is a flowchart illustrating an individual pass calculation for the control point curve.

FIG. 7 is a flowchart illustrating the manner in which the control point curve is generated.

FIG. 8 is a flowchart illustrating the method of point-to-point interpolation.

FIG. 9 is a flowchart illustrating the manner of calculation of the intermediate points.

FIG. 10 is a flowchart illustrating the method of calculating the connecting path between two portions of the part surface where a tangent discontinuity occurs.

FIG. 11 is a flowchart illustrating the manner of bisection of a line segment.

FIG. 12 is a flowchart illustrating the method of surface transition calculation.

DETAILED DESCRIPTION OF THE PREFERRED EMBODIMENTS

In a preferred embodiment, the system of this invention requires only a mathematical description of the ultimately desired surface of the part to be machined, and information regarding the tools to be employed in the machining, for example, type of tool and tool parameters.

The part to be machined can be considered as the union of multiple surfaces which may or may not intersect, may have gaps, or noncontinuous boundaries. Our system treats each such surface as a matrix of patches subject to continuity conditions along the patch boundaries. Each patch is a smooth patch mapped from a unit square (parameter space) into three-dimensional space. In the preferred embodiment of this invention, all patches are Coons patches in which the parameter space is a polynominal function with no more than cubic terms. In other embodiments of the invention, other types of patches may be employed, for example, Bezier patches in which higher order terms are permitted. Such higher order terms permit more rippling in the surface of the object to be manufactured.

The tools used for manufacturing the component are described to the system in suitable terms, for example, the radius of the tool, the corner radius of the portion of the tool coming in contact with the part, and any other necessary dimensions. For example, a standard mill, a rotating cylindrical tool having a flat lower surface has no corner radius of curvature, but has a tool radius of half its diameter. A bullnose cutting tool has a corner radius less than the tool radius, while a ballnose tool has a corner radius equal to the tool radius. Obviously, the characteristics of as many tools as desired may be supplied to the system. Essentially, the characteristics of the individual tools are incorporated into a tool system database, while the characteristics of the surface to be machined are incorporated in the manufactured part database. These databases and the overall system are shown in FIG. 1.

FIG. 1 is a block diagram of the overall system. As shown, the system is controlled by a CPU 13 which receives tool information from a tool database 12, part surface information from a part geometry database 11, and control information from a programmed control unit 10. Typically, the programmed control unit will consist of a computer program stored in an appropriate media. This information together with commands received from a user interface 14, typically a graphics terminal, controls the CPU and causes it to provide tool path information. Information from the CPU is supplied to a suitable interface 15 where it is converted into milling machine commands for control of a milling machine 16. In response to these commands, the milling machine mills a part 17 to the desired configuration as set forth in the part geometry database 11.

Theory of Operation

FIG. 2 is a diagram illustrating the manner by which the tool control point formula is determined. Given a specific tool, for any surface point on the object to be machined there is at least one tool control point, which represents a reference location for positioning of the tool to mill the material to the desired surface contour. As shown in FIG. 2, p is a point on the surface 4 of the object to be machined. The designation n represents the unit surface normal at location p, while r is the corner radius of the cutting tool. Ta is the axis of rotation of the tool, while w is the offset of the central point of corner radius from the central axis. Using this geometry, the tool control point Tp will be:

$$Tp = p + rn + (R-r)w - rTa$$

Allowing point p to range over the part surface 4 defines a discontinuous vector field.

$$T = S + rn + (R-r)w - rTa$$

Discontinuities in this vector field arise when the surface normal vector is the same as the tool axis. In theory, this resulting surface is the offset part surface for moving the tool across the part; however, allowance must still be made for gaps and discontinuities in the drive surface. Note that the tool control point is the vector sum of the surface normal and vectors describing the characteristic of the tool.

The system of the invention may be implemented with a variety of machining techniques. In the preferred embodiment, however, lace cutting is employed. In lace cutting the part is machined with passes in successive parallel planes. For example, if a three-dimensional x-y-z coordinate system is employed, the first pass of the cutting tool might be in the x-z plane with y maintained at zero. Then a second pass of the cutting tool could be made with y=1 in a plane parallel to the x-z plane. A third pass could have y=2. FIG. 3 depicts the offset lattice of tool control points for a curved surface. More tool control points may be added if a highly curved surface is to be machined, and fewer tool control points if a flatter surface is machined. By making the passes close enough together, a desired tolerance in the surface dimensions of the part may be achieved.

The offset lattice shown in FIG. 3 is determined by calculating the tool control points for a variety of points on the part surface 4. Next, a determination of a single pass in a single drive plane is made. This is done by a default condition in the system specifying the drive plane, i.e., the plane in which the cutting tool sweeps across the surface to be machined, and then employing the offset lattice to obtain a linked list of offset patches which intersect the drive plane. Next is the calculation of a series of intersections of offset patch boundaries with the drive plane. These points serve as an initial approximation for the control point curve. They are termed approximations because they represent the position of the control point curve at discrete locations spaced apart at the boundaries of patches on the surface of the object to be machined.

Using the series of points, one point at the intersection of the boundary of each patch with the drive plane, the geometry between points is analyzed for discontinuities in the tangent to the surface of the object. In particular, if conditions warrant more points are delineated between each given pair of points to assure that the control point curve is accurately represented. These additional points are computed by considering the perpendicular bisector between each pair of points and computing the intersection of that perpendicular bisector with the offset lattice (or proposed control point curve). If the control point curve between the intersection point and the first of the two given points is found to exceed tolerance, as determined by the geometrical characteristics between the two points under analysis, then the region between the two points under analysis is subdivided, i.e. the perpendicular bisector is constructed, another intersection point is computed, and the process repeated. Once the control point curve between successive points is within tolerance, the same process is applied to the initial intersection point and the second of the two given points. The resulting curve is a cubic curve (or spline) which represents the control point curve.

System Implementation

FIG. 4 is a flowchart illustrating the main loop in the control system as applied to lace cutting. FIG. 4 shows how the system steps from one cutting plane to the next. The starting point 20 for the control system of FIG. 4 requires that the user have picked the surface to be cut, the direction of cut, the direction of sweep (or tool movement), and the geometry of the tool. In the first step 21, a lattice of offset points is constructed. This step employs the tool control point formula discussed above, and establishes more points in regions which have greater curvature than in regions having lesser curvature. The union of tool control points provides the offset lattice. In step 22 the offset points furthest in and opposite to the direction of cut are determined, and in step 23 the offset points furthest in and opposite the direction of sweep are determined. The point furthest opposite the direction of sweep will lie in the first drive plane, while the point furthest in the direction of sweep will lie in the last drive plane. In step 24 the plane reference point is set to the point furthest opposite the direction of sweep. Next, as shown by step 25, a plane is constructed through the reference point having a normal vector in the direction of the sweep.

Next, as shown by step 26, the tool control point curve for intersection of the drive plane and the offset surface is calculated, as is the stepover distance. This step employs the process steps described below in conjunction with FIG. 7. At the completion of the process, the necessary output signals are generated in step 27.

These output signals are described further in conjunction with FIG. 5.

Following the generation of the output signals, a test is performed to determined whether the output signals generated were for the last pass in the particular cutting plane. If the test is positive, then the process ends as shown by block 29. If the test is negative, the drive plane reference point is moved in the direction of the sweep by the stepover distance (the distance between cutting planes). Following step 30 another test is performed to determine whether the last plane has been overshot. If so, then the process is returned to the last plane and steps 25 through 29 repeated, and the process ended at step 29. If the last plane has not been overshot, then control returns to step 25, and the process is repeated for the next cutting plane.

FIG. 5 is a flowchart illustrating in further detail the step 27 of generating the output information. This process, when called, first tests in step 34 to determine whether this operation is the first pass. If it is the first pass, then it is necessary to calculate an entry point to begin the cutting procedure. Typically, this entry point will be offset from the surface slightly to allow one edge of the tool to come in contact with the surface to be machined. Once the entry has been computed, then rapid motion shown in step 41 is calculated to move the tool to the necessary entry position, and as shown in step 42 the entry cut motion is generated.

In the more usual case, in step 34 the test for whether this cutting pass is the first pass will be negative, and control will pass to step 35. Step 35 inquires about whether an entry is to be computed for each pass. If not, control passes to step 37 where computation is made of the necessary path to transit to the first point of the tool control point curve. This step calculates a transition from the end of one pass to the beginning of the next pass. On the other hand, if at step 35 an entry at each pass is desired, then in step 38 the entry top position is calculated, and in step 39 a transition to the entry top is computed. The calculation of the entry top position is performed by taking the first point of the tool control point curve and adding the entry distance along the entry direction. (The same operation is performed in step 36). Once that step is complete, the entry cut motion is generated in step 40. Steps 37 and 39 are shown in further detail in the lower portion of FIG. 5.

Once these steps are complete, the control point curve has been determined and must be divided into chorded cut motion, i.e., straight line segments used to drive the milling machine. This is achieved in step 43.

After generation of the chorded cut motion, another test 44 is made as to whether the last pass has been completed. If the test is positive, an exit 46 is computed and exit motion 47 is determined. The exit motion moves the tool away from the part surface.

If, instead, step 44 returns a negative indication, then a further test 45 is made as to whether an exit for each pass is necessary. If so, control shifts back to block 46 for calculation of an exit, and if not, control passes to block 48. The exit is calculated by taking the last point of the tool control point curve and adding the exit distance along the exit direction. (At this step control is returned to block 27 in FIG. 4.)

The lower portion of FIG. 5 illustrates in further detail the steps of transiting to the entry point or to the first point in the tool control point curve. The process begins with a test 50 as to whether an entry for each pass is desired. The response to this test depends primarily on the tool and finish desired on the ultimate part. If an entry is not desired to every pass, then control passes to step 51 where a test is performed as to whether there is to be exit for every pass. If so, then control passes to step 52 where the cut motion to the destination is generated. Once this is complete, control returns via step 56 to step 40 or step 43, depending upon whether the process was called by step 37 or step 39.

On the other hand, if an exit is not desired on every pass in step 51, then control passes to block 53. Blocks 53, 54 and 55 describe the calculation of tool motion between passes. In the first step a vertical plane containing the first point of the current pass and the last point of the previous pass is constructed. Then, in step 54, the tool control point curve is calculated for this plane and for the offset surfaces. Step 54 is achieved using the process of FIG. 7. Finally, as shown in step 55, the chorded cut motion is generated for the tool control point curve in the same manner as step 43.

FIG. 6 is flowchart illustrating the procedure for calculating individual paths for the control point curve in an arbitrary drive surface. While the drive surface typically will be a plane, it need not be. As shown in FIG. 6, once the process starts the first step is to construct a list of active patches using the offset lattice and the drive surface. This is represented by block 61. During this operation those patches in the offset surface which intersect the drive surface are determined. Next, as shown by block 62, the tool positions are calculated which correspond to boundary points on all active patches. This is achieved by computing the intersection of the drive surface with the boundary of those patches. In a typical case, the drive surface will intersect at least two boundaries of each patch, one where it enters that patch and one where it leaves.

Next, step 63 is performed in which the starting and ending point from the tool boundary position for each active patch are chosen. This is the furthest point in each direction, and enables the system to check for gouging of the surface. If gouging is detected, i.e., a negative intersection of any part of the tool with the surface, then the tool position is raised and rechecked. The start and end points are chosen by the intersection of the drive plane with the extreme patches in opposite directions along the drive plane. If gouging is detected, a new tool position will be determined to eliminate it.

Once the start and endpoints are produced, then the step of block 64 is carried out. In this step the control point curve between the start and end positions is generated. This step is shown in further detail in FIG. 7, which is a block diagram of the process used to generate the control point curve. After starting 70, the current position of the tool is set to be equal to the start point as determined in step 63. Thus, at this step the system has determined which patch the control point curve is in, which parameter is being manipulated, and the tangent to the desired surface.

In step 72 the next point on the curve from the boundary point is deduced. This is accomplished by considering the tangent at the entry and exit points. In the normal case the tangent at the entry point will point into the patch in parameter space, while the tangent at the exit point will point out of the patch in parameter space. If that approach does not succeed in locating the closest point, then other approaches are employed, for example, by computing backward from the exit point or forward from the entry point to the closest point which still is on the curve.

Once the next point is deduced in step 72, step 73 is performed. In this step, if needed, an interpolation is performed to generate intermediate point representations between the current position and the next position of the tool. This step is described in further detail below in conjunction with FIG. 8.

After the interpolation is performed, test 74 is performed to determine whether the next position is near the end position, in other words, whether the next position is in the same patch with the end position. If the test is positive, then an interpolation step 75 is performed to generate an intermediate point between the next position and the end position. This interpolation step is also described in conjunction with FIG. 8 below.

On the other hand, if the next position is not near the end position, then the current position is set to be equal to the next position and the flow returns to step 72 as shown by arrow 77. Step 76 effective reassigned the next position deduced in step 72 to be the current position and continues with the flow.

FIG. 8 describes the process used for point-to-point interpolation. The input information for this portion of the process consists of the current position and the next position as supplied by step 73 in FIG. 7. If those two points are the same, then the test made in step 81 checks to see if the tangents of the two points are the same in step 82. Then it is known that the two points are the same point, and there is no need to proceed further. If the test is negative, then the curve is broken as shown by step 84, in other words, there is a discontinuity in the tangents and the surface of the part includes an angle, rather than a smoothly-curved surface or a gauge section, i.e. a concave area where the tool cannot fit. If this occurs, then the next position and the end position are the same, and the control point curve generator described in conjunction with FIG. 7 reverts to the start and begins processing the new curve.

Returning to step 81, if the current position and the next position are not the same (the usual case), then a test is performed to determine whether the points are on different surfaces. If the test is positive, then step 85 is performed in which the surface transition is calculated. The calculation of the surface transition is described in conjunction with FIG. 12.

If in step 83 the points are not found on a different surface, the process moves to test 88 where the existence of a tangent discontinuity of the part surface between the points under consideration is performed. This test is described in further detail in conjunction with FIG. 10. If a tangent discontinuity exists, then test 91 is performed in which it is determined whether the points are on adjacent patches. If so, then the connecting path is calculated using the process shown in FIG. 10. If the two points are not on adjacent patches, then an intermediate point is calculated in step 92. The calculation of the intermediate point is described in conjunction with FIG. 9.

The calculation of the intermediate point as shown in step 92 will also be reached from step 88 if a tangent discontinuity does not exist between the points under consideration. In this case the system transfers control to block 89 in which a determination is made as to whether any patches have been skipped, a tolerance violated, or whether a tangent discontinuity of the control point curve is probable. The tangent discontinuity test in step 89 determines whether there is a tangent discontinuity in the control point curve. If none of these conditions exist, then the subroutine ends. If any exist, however, then control returns to block 92 as described above.

Following step 92 two independent operations occur as shown in blocks 93 and 94. In the first independent operation, the next position is set to be equal to the intermediate point and control returns to start 80 where the next position is the intermediate point. Independently from step 92, the current position is set to be equal to the intermediate point, and control is returned to start 80.

FIG. 9 is a flowchart showing the intermediate point calculation process. This process begins with the initial point P1 and an endpoint P2, and the process determines an intermediate point between the two, which intermediate point lies within the desired tolerance of the control point curve. The process is called by step 92 in FIG. 8. The first step 101 is to construct the line segment between P1 and P2. Then the perpendicular bisector of that segment is constructed in step 102. The perpendicular bisector is extended to intersect with the offset surface in step 103, and then an intermediate point is selected from the intersection list in step 104. In the preferred embodiment there are four criteria for choosing the intermediate point. First, it must be in the half space determined by P1 and the tangent at P1. Second, it must not be in the half space determined by P2 and the tangent at P2. Third, the intermediate point must not be gouging the surface, and fourth, of all the points satisfying the first three criteria, the point is chosen whose surface geometry is nearest the surface geometry of P1 and/or P2.

FIG. 10 is a flowchart illustrating the steps employed in determining the connecting path calculation if there is a tangent discontinuity of the part surface between the points shown in block 88 of FIG. 8. The steps in FIG. 10 calculate the connecting path between the part surface between the points of tangent discontinuity. The process begins with points P1 and P2 and the knowledge that a tangent discontinuity exists between the points, as shown in block 110. The first step 111 of the process is to analyze the geometry of the part surface. Specifically, as shown by step 112, a determination is made as to whether the concavity of the surface is away from the tool. If so, then Newton's method is employed as shown by step 113. In Newton's method a tangent at point P1 is considered, and the intersection of that tangent with the offset surface is determined. That point is stored and the procedure repeated at that point. Eventually in the greater number of cases, the points will converge on the location on the surface where the tangent discontinuity exists. If so, then the process is ended at step 116 and the connecting path between the part surface tangent discontinuities has been determined. If not, the bisection scheme of step 117 is employed. This process is similar to the calculation of the intermediate point described above in conjunction with FIG. 9, but uses different criteria for choosing the point. These criteria are discussed in conjunction with FIG. 11.

Returning to step 112, if the concavity is not away from the tool, then control passes to step 114 in which the retracting path is calculated. Depending on the surface geometry at the points of contact and the vertical component of the tool motion at those points, the tool path retraction is along the respective tangents at each point in such manner as to clear the highest surface area between the two points. Once the highest area has been cleared, a straight line motion is inserted between the resulting points on the tangents. If the highest area is at either of the initial-two points, the resulting path is simply derived from the intersection of the two tangent lines.

FIG. 11 is a description of the technique of the bisection scheme as shown in block 117 of FIG. 10. The bisection scheme begins at step 120 with points P1 and P2. Next, an intermediate point is calculated in step 121 using the procedure shown in further detail in FIG. 9. Once the intermediate point has been obtained, step 122 performs an interpolation between point P1 and the intermediate point. At the same time in step 123, an interpolation is performed between point P2 and the intermediate point.

FIG. 12 is a diagram illustrating the surface transition calculation called for in step 85 of FIG. 8. The surface transition calculation begins at step 130 with points P1 and P2. In step 131 a test is performed to determine whether the points are equal. If so, then test 132 is performed to determine whether the tangents are equal. If both the points and the tangents are equal, then the procedure stops at step 134. Instead, if at step 132 the tangents are not equal, then the curve is broken at that point as shown by step 133, and the procedure ended at step 135.

If the points are not found to be equal in step 131, then a line segment is constructed between points P1 and P2 in step 136. Next, the perpendicular bisector between points P1 and P2 is constructed in step 137, and then a calculation of the intersection points of the bisector with the offset surfaces is performed in step 138. Then in step 139, the appropriate intermediate point is chosen, using the same criterion as described in conjunction with FIG. 9. Finally, after the intermediate point is chosen, steps 140 and 141 are performed in which interpolations between the intermediate point and point P1 and the intermediate point and point P2 are performed using the process of FIG. 8.

We claim:

1. A method for controlling a machine tool to mill a surface of a part having a known mathematical representation, the method comprising:
   using the mathematical representation of the surface of the part, calculating an approximate offset surface for the surface to be milled;
   comparing the approximate offset surface with a drive surface for the machine tool to define an approximate tool control point curve for the machine tool;
   calculating an actual tool control point curve by comparing the approximate tool control point curve with the mathematical representation of the surface of the part; and
   supplying a numerical representation of the resulting actual tool control point curve for use by apparatus for controlling the machine tool to enable the tool to move over a portion of the actual tool control point curve.

2. A method as in claim 1 wherein the drive surface comprises a plane.

3. A method as in claim 1 wherein the surface of the part is divided into patches each having a geometry and the step of calculating an approximate offset surface comprises:
   storing data representative of the geometry of each patch of the surface of the part; and
   for each patch using the stored data to calculate a discrete lattice of tool control points, the number of tool control points in the lattice depending upon the geometry of that patch.

4. A method as in claim 3 wherein the step of calculating the actual tool control point curve comprises calculating for a series of points on the curve $$Tp = p + rn + (R-r)w - rTa$$

where Tp is the tool control point, p is a point on the part surface, r is a corner radius of the machine tool, n is a unit normal vector to p, R is a radius of the machine tool, Ta is the axis of rotation of the machine tool, and w is a unit component of n perpendicular to Ta.

5. A method as in claim 3 wherein the offset surface comprises a surface containing at least some of the actual tool control points for the patches.

6. A method as in claim 5 wherein each point on the offset surface corresponds in a one-to-one manner with a point on the part surface.

7. A method as in claim 3 wherein the step of comparing the offset surface with a drive surface comprises:
   specifying the drive surface;
   using the discrete lattice of tool control points, calculating a linked list of the patches which intersect the drive surface; and
   combining the actual tool control points for each of the patches in the linked list to define thereby an initial approximation for the tool control point curve consisting of a minimum of two points for each patch.

8. A method as in claim 7 wherein the step of calculating the actual tool control point curve comprises:
   testing the mathematical representation of the surface between each pair of actual tool control points for a plurality of selected conditions.

9. A method as in claim 8 wherein one of the selected conditions comprises tolerance of the tool control point curve to within a specified amount of the mathematical representation of the surface.

10. A method as in claim 10 wherein he step of calculating the actual tool control point curve includes steps comprising:
   (1) when a segment of the approximate tool control point curve between a pair of actual tool control points is not within tolerance of the mathematical representation, then calculating an intermediate actual tool control point;
   (2) testing the tolerance of the tool control point curve between the intermediate actual tool control point and one of the pair of actual tool control points;
   repeating steps (1) and (2) above if the tool control point curve is not within tolerance;
   testing the tolerance of the tool control point curve between the intermediate point and the other of the pair of actual tool control points; and
   repeating steps (1) and (2) above if the tool control point curve is not within tolerance.

11. A method as in claim 8 wherein one of the selected conditions comprises a tangent discontinuity in the mathematical representation.

12. A method as in claim 11 wherein the step of calculating the actual tool control point curve includes steps comprising:
   (1) when a segment of the approximate tool control point curve between a pair of actual tool control points crosses a tangent discontinuity, then (2) calculating if the pair of actual tool control points are on adjacent patches;

(3) if so, then calculating a connecting path between the actual tool control points;

(4) if not, then calculating an intermediate actual tool control point, repeating steps (1)–(4) for one of the pair of actual tool control points and the intermediate actual tool control point; and then repeating steps (1)–(4) for the other of the pair of actual tool control points and the intermediate actual tool control point.

13. A method as in claim 12 wherein the step of calculating a connecting path comprises:

using the mathematical representation of the surface of the part to determine whether concavity of the surface is toward or away from the tool;

if concavity is away from the tool, then calculating an intersection of a tangent at a plurality of surface points with the offset surface; and if concavity is toward the tool, the calculating a path for retracting the tool to clear a highest part surface point between the pair of actual tool control points and using a set of straight line motions connecting those points.

14. A method as in claim 12 wherein the step of calculating an intermediate actual tool control point comprises:

calculating a location for a line segment between a pair of points on the surface of the part corresponding to the pair of actual tool control points;

using the calculated line segment, calculating a perpendicular bisector of the line segment;

calculating intersection points of the perpendicular bisector with the offset surface; and selecting the intermediate actual tool control point from the set of intersection points of the bisector with the offset surface.

15. A method for controlling a machine tool to mill a surface of a part having a known mathematical representation, the method comprising:

using the known mathematical representation, calculating an approximate offset surface of the surface to be milled;

calculating the location of points on the offset surface which points are furthest in and opposite a direction in which a cut is to occur;

calculating coordinates of a plane through the point furthest opposite the direction of the cut;

calculating a tool control point curve for the cut using the intersection of the plane with the offset surface; and supplying a numerical representation of the tool control point curve for use by apparatus for controlling the machine tool to move over a portion of the tool control point curve.

16. A method as in claim 15 wherein a direction of sweep for the machine tool is specified, further comprising the steps of:

calculating coordinates for a point on the offset surface which is furthest in and for a point furthest opposite the direction of sweep; and using the coordinates of a plane through the point furthest opposite the direction of sweep to control the machine tool.

* * * * *